United States Patent [19]

Van Scott et al.

[11] 3,920,840

[45] Nov. 18, 1975

[54] TREATMENT OF PSORIASIS WITH N-METHYLDIETHANOLAMINE

[76] Inventors: Eugene J. Van Scott, 1138 Sewell Lane, Rydal, Pa. 19046; Ruey J. Yu, 4400 Dexter St., Philadelphia, Pa. 19128

[22] Filed: Mar. 28, 1974

[21] Appl. No.: 455,665

Related U.S. Application Data

[63] Continuation-in-part of Ser. No. 371,516, June 19, 1973.

[52] U.S. Cl. .................................................. 424/325
[51] Int. Cl.² ........................................... A61K 31/13
[58] Field of Search .................. 424/325; 260/584 R

[56] References Cited
UNITED STATES PATENTS

| | | | |
|---|---|---|---|
| 2,163,099 | 6/1939 | Maxwell | 260/584 R |
| 2,451,942 | 10/1948 | Gresham | 260/584 R |
| 2,541,088 | 2/1951 | Nikawitz | 260/584 R |

OTHER PUBLICATIONS

Handbook of Non-Prescription Drugs, 1973, pp. 163–165.

Remington's Pharmaceutical Sciences, 1965, pp. 527–529.

Merck Index, 8th Edition, (1968), p. 356.

Chemical Abstracts: Vol. 53, 3050(e), 1959.

*Primary Examiner*—Norman A. Drezin
*Attorney, Agent, or Firm*—LeBlanc & Shur

[57] ABSTRACT

A treatment to alleviate the symptoms of psoriasis consisting of topical application of a cream, ointment or lotion containing as the active ingredient N-methyldiethanolamine is disclosed.

The therapeutic composition may include N-methyldiethanolamine present in a total amount of from about 0.5 to 5 percent by weight in either a cream or ointment, a water or alcohol solution. Topical application to affected areas has been found to achieve from substantial to complete remissions of psoriasis in humans.

17 Claims, No Drawings

TREATMENT OF PSORIASIS WITH N-METHYLDIETHANOLAMINE

This application is a continuation-in-part of our application Ser. No. 371,516, filed June 19, 1973.

This invention relates to a treatment for psoriasis and specifically to a compound which has been found to be effective when topically applied, to improve and heal the skin lesions of psoriasis in humans.

Psoriasis is a chronic skin disease, and is today a disfiguring and disabling cutaneous impairment to millions of persons. Its etiology is completely unknown, and therefore, prevention remains inconceivable. Therapy has necessarily been empiric, and has included the systemic use of antimitotic drugs such as methotrexate to induce remissions of the lesions. However, acute and chronic toxicity on tissues other than skin has discredited use of methotrexate. Therefore, it became imperative that other means of therapy be found either by external delivery of drugs so that toxicity is confined chiefly to the skin, or by the discovery of new drugs having nontoxic attributes.

In our parent patent application entitled "Treatment of Psoriasis" Ser. No. 371,516, with a filing date of June 19, 1973, we described and claimed our discovery that mechlorethamine hydrochloride ointment may be effectively utilized in the treatment of psoriasis by topical application and that in an oil base the compound formed a stable composition. Prior to our above invention mechlorethamine hydrochloride, a nitrogen mustard, had been generally discounted as a treatment for psoriasis because, in effective dosages, a high percentage of patients became sensitized. In addition, the compound proved to be highly unstable in an aqueous solution and rapidly degraded to ineffective byproducts.

Our above invention included the discovery that an immunologic tolerance in patients could be developed to avoid hypersensitive reactions. The procedure for inducing immune tolerance includes weekly intravenous injections of 0.2 mg of mechlorethamine hydrochloride in an aqueous solution over at least a three week period prior to initiation of the topical therapy.

It has now been discovered, however, that psoriatic conditions may be successfully treated by utilizing a degradation product of mechlorethamine hydrochloride, N-methyldiethanolamine, which is primarily neither antimitotic nor allergenic. This compound has been found to be essentially nontoxic to both animals and humans. When used as a topical agent the therapeutic dose of the compound in ointment or solution may vary from 0.5 to 5 percent by weight with no detectable signs of any irritation to human skin. Use of this compound then eliminates the need of initially inducing an immunologic tolerance.

N-methyldiethanolamine, also known as methyl-bis-($\beta$-hydroxyethyl)amine, has been found as one of the degradation products of mechlorethamine hydrochloride in an aged aqueous solution. In our above described prior invention we found that whereas a therapeutic dose of mechlorethamine hydrochloride itself in a stable composition may vary from 0.01 to 0.05 percent by weight, its three degradation products in a concentration of this range were therapeutically ineffective against psoriasis when applied topically. We have now discovered that chemically pure N-methyldiethanolamine is therapeutically effective in a topical treatment of psoriasis at a substantially higher concentration range from about 0.5 to 5 percent by weight.

We have established through extensive tests on humans having psoriatic conditions that topical application of either a cream or ointment, or a water or alcohol solution containing from 0.5 to 5 percent of N-methyldiethanolamine is effective, when applied on a daily basis to cause usually within one to two weeks time, either a restoration of the affected areas to a normal skin appearance or at least a substantial improvement thereof.

Accordingly, it is the object of this invention to provide a relatively nontoxic, nonallergenic medicinal composition which when topically applied will reliably alleviate or improve the symptoms of psoriasis.

It is another object to provide a method for treating psoriasis with a relatively nontoxic cream, ointment or solution of water or alcohol containing N-methyldiethanolamine.

It is still another object to provide a safe and efficient method for treating the symptoms of psoriasis through regular topical application of a medicinal composition containing N-methyldiethanolamine which will promote healing within about one to two weeks.

Specifically, the compound of this invention found to be useful in the treatment of psoriasis is N-methyldiethanolamine present in a vehicle in a concentration of from 0.5 percent to 5.0 percent, by weight.

PREPARATION OF THE THERAPEUTIC COMPOSITIONS

In order to prepare the compositions of this invention, N-methyldiethanolamine is preferably dissolved in water with or without neutralization with 1N HCl. The solution thus prepared may be admixed in the conventional manner with commonly available cream or ointment bases such as hydrophilic ointment, USP. Alternatively, N-methyldiethanolamine, normally a syrupy substance, with or without dissolution in anhydrous ethanol initially may be directly admixed with petrolatum, USP. The concentration of the compound ranges from 0.5 to 5 percent by weight of the total composition. The preferred concentration range, however, is from 0.5 percent to 1 percent.

The water, ethanol or 1N HCl used to dissolve or neutralize the compound according to this invention may range in concentration of from 1 to 20 percent by volume, of the total composition. The preferred concentration thereof, however, is 10 percent by volume.

It has been found that the therapeutic creams or ointments of this invention, prepared as above, may be stored in ointment jars at room temperature for extended periods of time without a change in the clinical effectiveness of the composition against psoriasis.

N-methyldiethanolamine may also be prepared in a solution or lotion form. A typical solution of this invention utilizes N-methyldiethanolamine dissolved directly in a mixture of water, ethanol and propylene glycol in a volume ratio of 40:40:20, respectively. The ph of the solution may be adjusted to between 5 and 6 with 4N HCl. The ratio of each vehicle may vary; however, the preferred concentrations of ethanol and propylene glycol should not exceed 70 and 30 percent, respectively. When solutions are formulated according to this invention, the compound concentratioin range may be from 0.5 to 5 percent by weight.

The following are illustrative but not limited examples of formulations of compositions according to this invention.

EXAMPLE 1

A N-methyldiethanolamine 1 percent in hydrophilic ointment may be prepared as follows:

N-methyldiethanolamine 1 g is dissolved in water (9 ml), and the solution thus obtained is admixed with commercially available USP grade hydrophilic ointment (90 g) to a uniform consistencey. The ointment thus prepared is stored in preferably opaque jars at room temperature.

EXAMPLE 2

A N-methyldiethanolamine 0.5 percent in anhydrous base may be prepared as follows:

N-methyldiethanolamine 0.5 g is directly admixed with white solid petrolatum, USP (60 g) and liquid petrolatum, USP (39.5 g) to a uniform consistency. The anhydrous ointment thus prepared is stored in opaque jars at room temperature.

EXAMPLE 3

A N-methyldiethanolamine 1 percent in water/oil cream may be prepared as follows:

N-methyldiethanolamine 1 g is dissolved in 1N HCl (9 ml) and the solution thus obtained is admixed with water/oil cream to a uniform consistency. The cream thus prepared is stored in opaque jars at room temperature.

EXAMPLE 4

A N-methyldiethanolamine 1 percent in water may be prepared as follows:

N-methyldiethanolamine 1 g is dissolved in water (99 ml), and the solution thus prepared is stored in a plastic bottle at room temperature.

EXAMPLE 5

A N-methyldiethanolamine 1 percent in a mixed solution may be prepared as follows:

N-methyldiethanolamine 1 g is dissolved in water (40 ml), ethanol (40 ml), and propylene glycol (19 ml). The solution thus prepared is stored in a plastic bottle at room temperature.

TEST RESULTS

A total of 17 patients having psoriasis were treated with a composition as follows:

Patients with psoriasis were instructed to apply a thin film of a cream or ointment, formulated according to the examples above, to the lesions. Twice daily topical application was continued for several weeks. Generally, the affected skin became less scaly and less erythematous after a week of topical treatment. The scaly and erythematous lesions ordinarily were substantially gone after two weeks of treatment. The sites of the lesions, devoid of any scales and erythema, usually reached an improved state comparable to normal appearing skin within one to two weeks after initial treatment.

Once a normal appearing skin was restored, it remained improved for from a week to several weeks, varying from patient to patient, without further application of the ointment. It is, however, necessary to continue the application of the ointment in order to maintain the skin in an improved state.

A total of 17 patients having psoriasis were teated topically by compositions of the present invention of which 15 patients showed a complete restoration of psoriatic skin to normal looking and normal feeling skin within about two weeks of initiating daily topical administration. Of the remaining two patients a less but substantial degree of improvement of the psoriatic lesions has been achieved within the same period of time. The method of application utilized herein generally required twice daily topical applications, and the scaliness of lesions ordinarily was substantially minimized after about one week of treatment.

As noted above, treatment with the compositions of this invention however does not result in a permanent cure. When regular application of a composition of this invention is terminated, normal appearing skin will remain for varying periods of time from a week to several weeks, depending upon the patient, but finally lesions return or new lesions appear. However, when regular application is resumed the lesions again improve and normal appearing skin is restored.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A composition for the topical treatment of psoriasis comprising:
   0.5 to 5.0 percent by weight of N-Methyldiethanolamine in admixture with a mixture of water, ethanol, and propylene glycol in a volume ratio of 40:40:20.

2. A composition for the topical treatment of psoriasis comprising:
   0.5 to 5.0 percent by weight of N-Methyldiethanolamine in an admixture with hydrophilic ointment.

3. A composition for the treatment of psoriasis comprising: 0.5 to 5.0 percent by weight of N-methyldiethanolamine in admixture with petrolatum.

4. A composition for the topical treatment of psoriasis comprising 0.5 to 5.0 percent by weight of N-methyldiethanolamine in admixture with a mixture of petrolatum and liquid petrolatum.

5. The composition of claim 1 wherein the N-methyldiethanolamine is present in from 0.5 to about 1 percent by weight.

6. The composition of claim 1 wherein the pH thereof is from about 5 to about 6.

7. A method of treating psoriasis in a human suffering therefrom comprising the topical application to involved portions of the said human of an effective amount of a therapeutic composition containing from about 0.5 to about 5.0 percent by weight of N-methyldiethanolamine in admixture with a pharmaceutically acceptable carrier.

8. The method of claim 7 wherein the N-methyldiethanolamine is present in from 0.5 to about 1 percent by weight.

9. The method of claim 7 wherein the pH of the composition is from about 5 to about 6.

10. The method of claim 7 wherein the carrier consists essentially of water, ethanol, and propylene glycol, the concentration of ethanol being not more than about 70 percent by weight of the total composition, and the concentration of propylene glycol being not more than about 30 percent by weight of the total composition.

11. The method of claim 7 wherein the carrier consists essentially of water, ethanol, and propylene glycol present in a volume ratio of 40:40:20, respectively.

12. The method of claim 7 wherein the carrier is petrolatum.

13. The method of claim 7 wherein the carrier includes a member selected from the group consisting of water and ethanol, present in a concentration of from 1 to about 20 percent by volume of the total composition.

14. The method of claim 13 wherein said member is present in about 10 percent by volume of the total composition.

15. The method of claim 7 wherein the carrier comprises a mixture of while solid petrolatum and liquid petrolatum.

16. The method of claim 7 wherein the carrier consists essentially of water.

17. The method of claim 7 wherein said composition is applied topically to psoriasis lesions at least once daily.

* * * * *